US012631046B1

(12) United States Patent
Freville

(10) Patent No.: US 12,631,046 B1
(45) Date of Patent: May 19, 2026

(54) DISC DETAINER LOCK

(71) Applicant: Nicholas David Freville, Pittsburgh, PA (US)

(72) Inventor: Nicholas David Freville, Pittsburgh, PA (US)

( * ) Notice: Subject to any disclaimer, the term of this patent is extended or adjusted under 35 U.S.C. 154(b) by 15 days.

(21) Appl. No.: 18/897,780

(22) Filed: Sep. 26, 2024

(51) Int. Cl.
*E05B 17/20* (2006.01)
*E05B 21/06* (2006.01)

(52) U.S. Cl.
CPC ........ *E05B 17/2084* (2013.01); *E05B 21/066* (2013.01)

(58) Field of Classification Search
CPC ........................... E05B 17/2084; E05B 21/066
USPC ........................................................... 70/355
See application file for complete search history.

(56) References Cited

U.S. PATENT DOCUMENTS 4,062,211 A * 12/1977 Miller .................. E05B 21/066 70/366
4,083,212 A * 4/1978 Proefrock ........... E05B 17/0062 70/366
4,942,749 A * 7/1990 Rabinow ............. E05B 29/0066 70/495
7,768,378 B2 * 8/2010 Hill ......................... E05B 39/04 70/81
2018/0171662 A1 * 6/2018 Lin ..................... E05B 29/0066
2024/0229508 A9 * 7/2024 Lin ..................... E05B 29/0013

* cited by examiner

*Primary Examiner* — Nathan Cumar
(74) *Attorney, Agent, or Firm* — Andrew Behrens; Trenam Law

(57) ABSTRACT

An improved disc detainer lock designed to enhance security by preventing lock picking. The lock features multiple rotatable discs, each with a code gate that aligns with a code sidebar when the correct key is used. A synchronizer is incorporated to engage the discs and rotate them simultaneously, preventing independent manipulation. This synchronization ensures that all discs co-rotate, making the lock resistant to picking attempts.

20 Claims, 13 Drawing Sheets

DISC DETAINER LOCK

BACKGROUND OF THE INVENTION

Field of the Invention

This invention relates, generally, to disc detainer locks. More specifically, it relates to an improved disc detainer lock designed to prevent lock picking.

Brief Description of the Prior Art

Disc detainer locks, commonly referred to as disc tumbler locks, are a widely used type of locking mechanism known for their high security and resistance to environmental wear. These locks operate by employing a series of stacked, rotatable discs, each having a specific code gate that must align with a sidebar for the lock to open. The key for a disc detainer lock features specific cuts that engage with these discs. During operation, the key is inserted into the keyway and engages with the discs when the key is rotated. The discs rotate in accordance with the design of the key. When all the gates of the discs are properly aligned, the sidebar drops into the gates, allowing the lock to be turned open.

Despite their reputation for being more secure than traditional pin-tumbler locks, disc detainer locks are not immune to picking. In a typical lock-picking attempt, a specialized tool is inserted into the keyway to apply rotational tension to one or more of the discs. With this tension applied, the picker then manipulates each disc individually, rotating it to align the correct gate with the sidebar. This process, though requiring skill, is feasible with the right tools and knowledge, especially since false gates—commonly included to mislead pickers—can sometimes be bypassed by an experienced individual.

Although disc detainer locks offer enhanced resistance to many traditional picking methods, the growing availability of disc detainer picking tools and techniques has highlighted the need for further advancements in lock security. Accordingly, what is needed is an improved disc detainer lock. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved disc detainer lock is now met by a new, useful, and nonobvious invention.

The improved disc detainer lock includes a plurality of rotatable discs wherein each disc includes an outer periphery and a code gate disposed within the outer periphery. The improved lock further includes a code sidebar configured to at least partially reside within the code gate of each disc when an appropriate key is used to rotate the plurality of discs to align the code gates with the code sidebar. The lock also includes a synchronizer that is configured to operably engage each disc when each disc is rotated a predetermined amount, thereby causing co-rotation of the synchronizer and each disc engaged with the synchronizer.

Some embodiments include the foregoing components residing within an outer housing. In some embodiments, the discs reside within a disc carrier that is configured to rotate relative to the outer housing. The synchronizer can also reside within an outer perimeter of the disc carrier in some embodiments. Moreover, the disc carrier and each disc includes a keyway configured to receive the appropriate key.

In some embodiments, the lock includes a synchronizer sidebar and a synchronizer sidebar gate disposed in the synchronizer. The synchronizer code bar is configured to at least partially enter the synchronizer sidebar gate when the synchronizer is rotated to bring the synchronizer sidebar gate into alignment with the synchronizer sidebar.

In some embodiments, the outer housing includes a sidebar groove disposed in an internal surface of a sidewall of the outer housing and a synchronizer sidebar groove disposed in the internal surface of the sidewall of the outer housing. The sidebar groove is sized to at least partially house the code sidebar and the synchronizer sidebar groove is sized to at least partially house a synchronizer sidebar when the disc detainer lock is locked.

The lock may also include a sidebar passage and a synchronizer side bar passage disposed through a disc carrier. The disc carrier is configured to rotate relative to the outer housing thereby allowing passage of one or both sidebars when aligned with their respective passages.

In some embodiments, each disc includes a plurality of gear teeth configured to operably engage the synchronizer. In addition, some embodiments include a drive disc configured to rotate at a same rate of rotation as the appropriate key.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
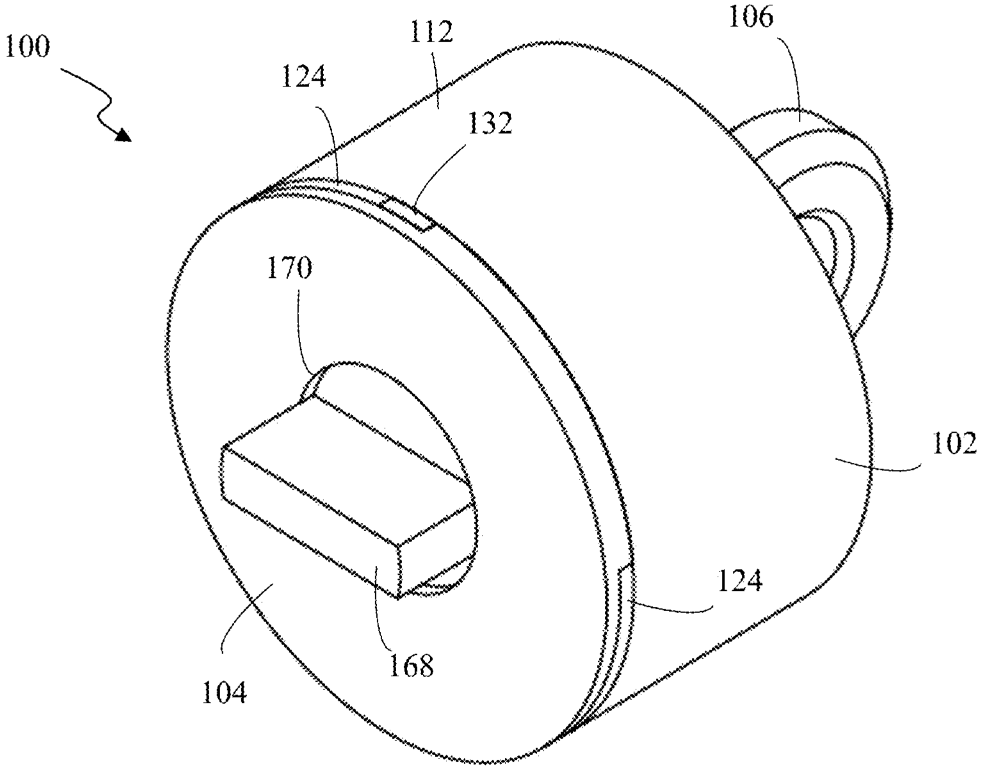
FIG. 1 is a rear perspective view of an embodiment of the present invention.

In the following detailed description of the present invention, reference is made to the accompanying drawings, which form a part thereof, and within which are shown by way of illustration specific embodiments by which the invention may be practiced. Numerous specific details are set forth to provide a thorough description of the embodiments of the present invention. It will be apparent to one of ordinary skill in the art that some embodiments may be practiced without some of these specific details. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

All numerical designations, such as measurements, efficacies, physical characteristics, forces, and other designations, including ranges, are approximations which are varied up or down by increments of 1.0 or 0.1, as appropriate. It is to be understood, even if it is not always explicitly stated that all numerical designations are preceded by the term "approximately." As used herein, "approximately" refers to being within an acceptable error range for the particular value as determined by one of ordinary skill in the art, which will depend in part on how the value is measured or determined. When an acceptable range is not dictated by the one of ordinary skill in the art, "approximately" refers to +15% of the numerical when used in connection with particular values; it should be understood that a numerical including an associated range with a lower boundary of greater than zero must be a non-zero numerical, and the term "approximately" should be understood to include only non-zero values in such scenarios.

The phrases "in some embodiments," "according to some embodiments," "in the embodiments shown," "in other embodiments," and the like generally mean the particular feature, structure, or characteristic following the phrase is included in at least one implementation. In addition, such phrases do not necessarily refer to the same embodiments or different embodiments.

The present invention, referred to herein as a Synchronized Disk Detainer Lock (SDDL) improves upon traditional disc detainer locks by synchronizing the movement of all discs within the lock, making it significantly more difficult to pick. In a typical disc detainer lock, each disc can be rotated independently, allowing an attacker to sequentially manipulate each disc to align its gates with the sidebar. The SDDL overcomes this vulnerability by incorporating a synchronizer configured to co-rotate all discs together so that movement in one disc causes synchronized movement in the others.

Referring now to FIGS. 1-6, SDDL 100 includes outer housing 102, outer housing cap 104, and key 106 specifically configured to work with a particular SDDL 100. Outer housing 102 includes front wall 108 with keyway 110 and one or more sidewalls 112 extending from front wall 108 thereby creating a receiving area for the internal components described in subsequent sections.

Sidewall 112 includes sidebar groove 114 and synchronizer sidebar groove 116. Each groove 114, 116 is disposed within the internal surface of sidewall 112 and are sufficiently sized to partially house code sidebar 120 and synchronizer sidebar 122 when SDDL 100 is in a locked position as shown in FIG. 6.

In some embodiments, sidebar groove 114 is larger in a circumferential extent than synchronizer sidebar groove 116. For example, sidebar groove 114 can be sufficiently sized to allow approximately 20 degrees of rotation before sidebar 120 binds on one of the sides of sidebar groove 114 while synchronizer sidebar groove 116 can be sufficiently sized to allow approximately 7 degrees of rotation before synchronizer sidebar 122 binds on one of the sides of synchronizer sidebar groove 116. As a result, synchronizer sidebar 122 will firmly lock synchronizer 144 in place before pressure is applied to code sidebar 120. This "locking" also jams/pushes synchronizer 144 into disc gear teeth 178 which can help to reduce gear tooth backlash.

Figure 2:
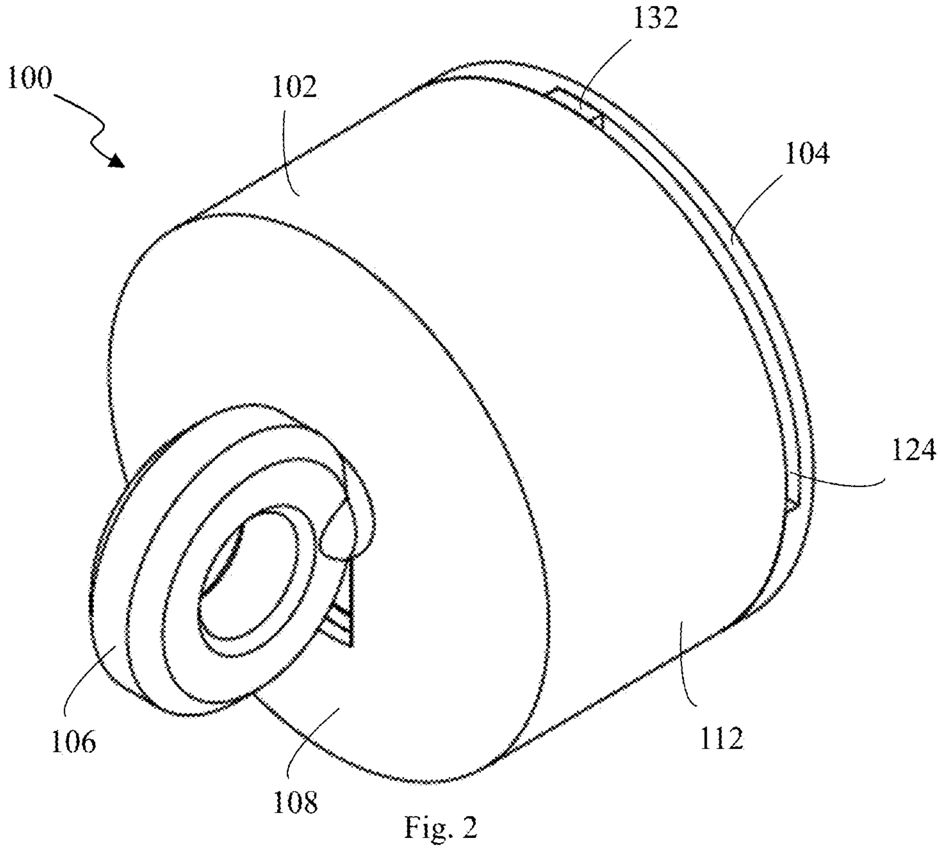
FIG. 2 is a front perspective view of an embodiment of the present invention.
Figure 3:
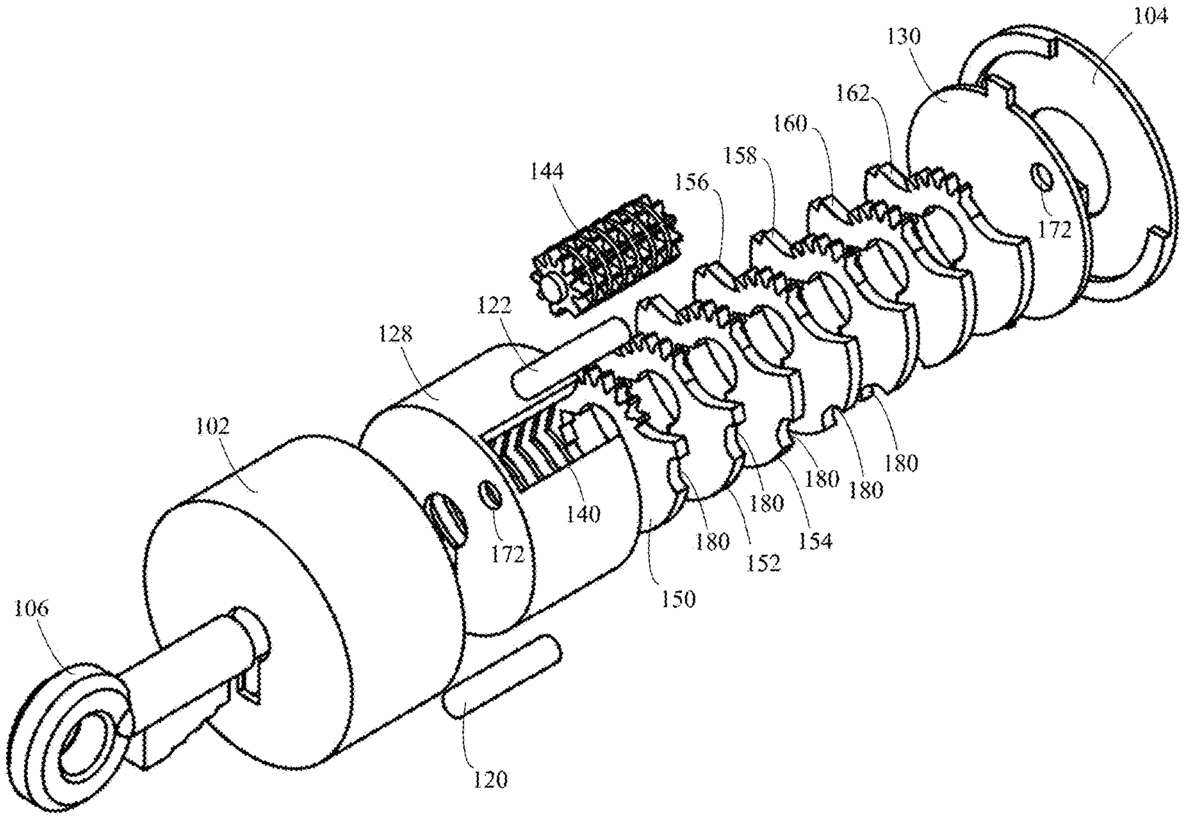
FIG. 3 is an exploded view of an embodiment of the present invention.
Figure 4:
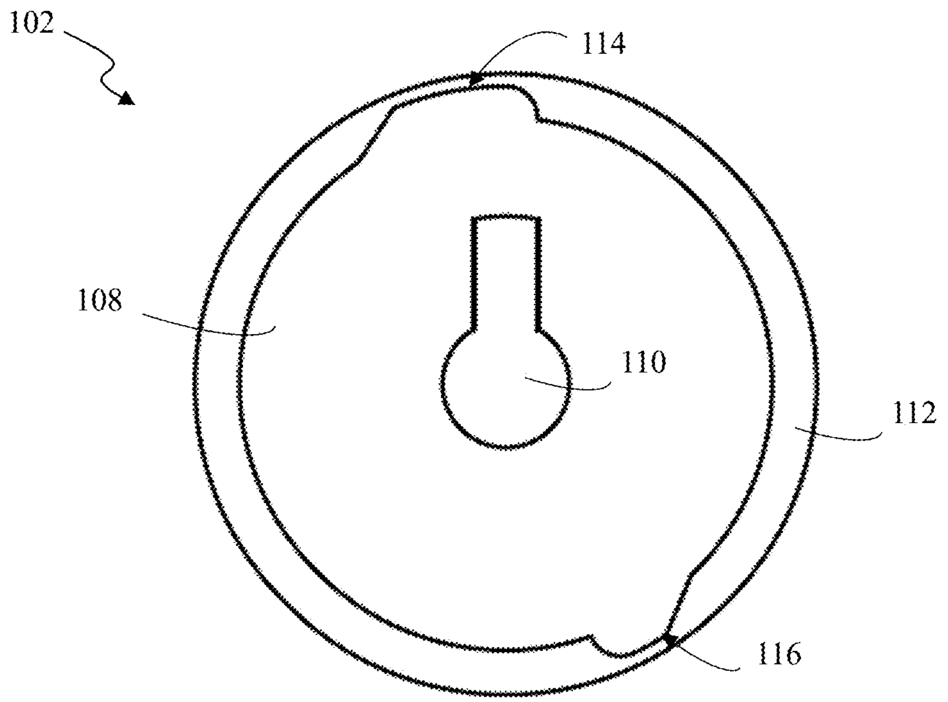
FIG. 4 is a front view of an embodiment of the outer housing in accordance with an embodiment of the present invention.
Figure 5A:
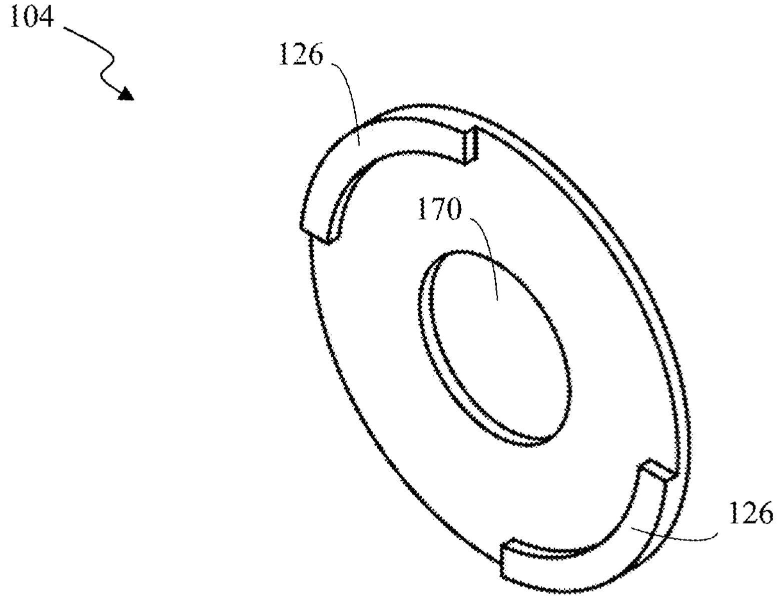
FIG. 5A is a perspective view of an embodiment of the outer housing cap in accordance with an embodiment of the present invention.
Figure 5B:
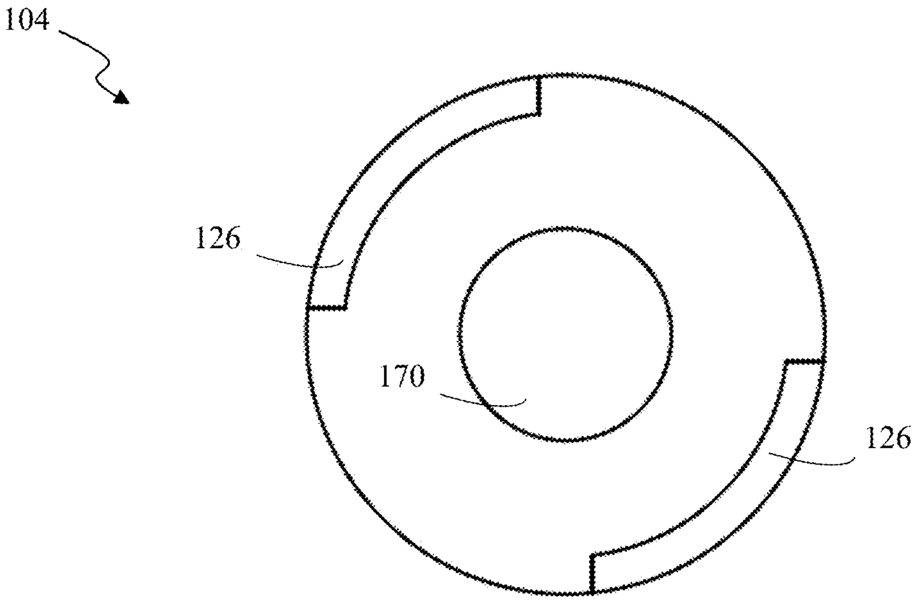
FIG. 5B is a front view of an embodiment of the outer housing cap in accordance with an embodiment of the present invention.

SDDL 100 also includes one or more pawl slots 124 which are established by the attachment of outer housing cap 104 to outer housing 102. As best depicted in FIGS. 5, outer housing cap 104 includes a pair of curved projections 126 that extend inwardly and proximally (towards front wall 108). In some embodiments, projections 126 are diametrically opposed and extend approximately 90 degrees about the circumference of outer housing cap 104. Projections 126 contact sidewall 112 as illustrated in FIGS. 1-2, thereby establishing pawl slots 124 at locations devoid of projections 126.

Figure 6:
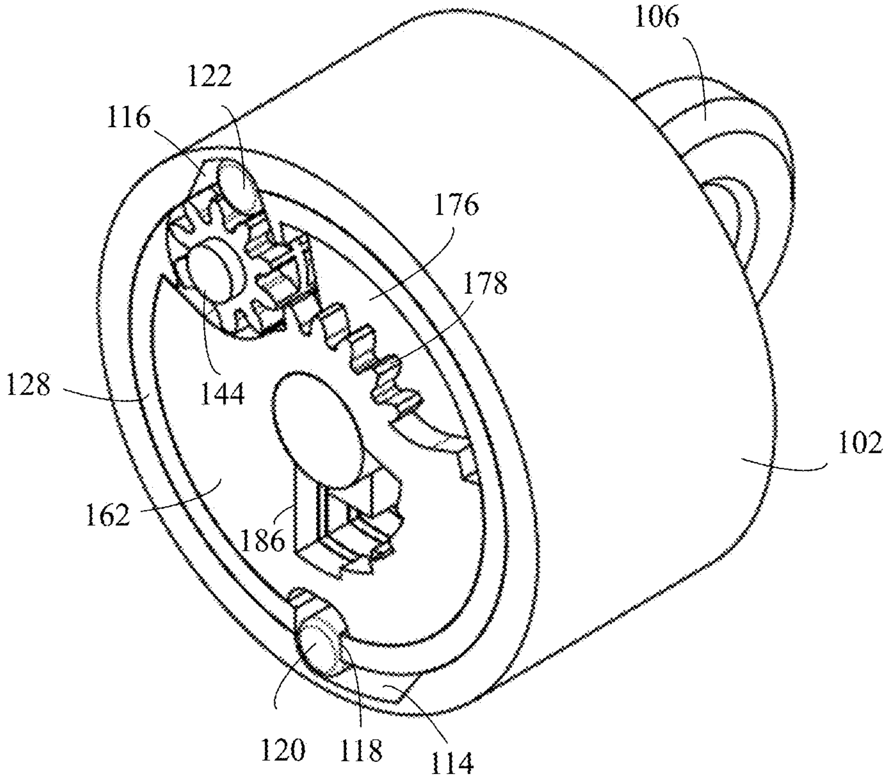
FIG. 6 is a rear perspective view of an embodiment of the present invention with the outer housing cap and disc carrier cap removed.
Figure 7:
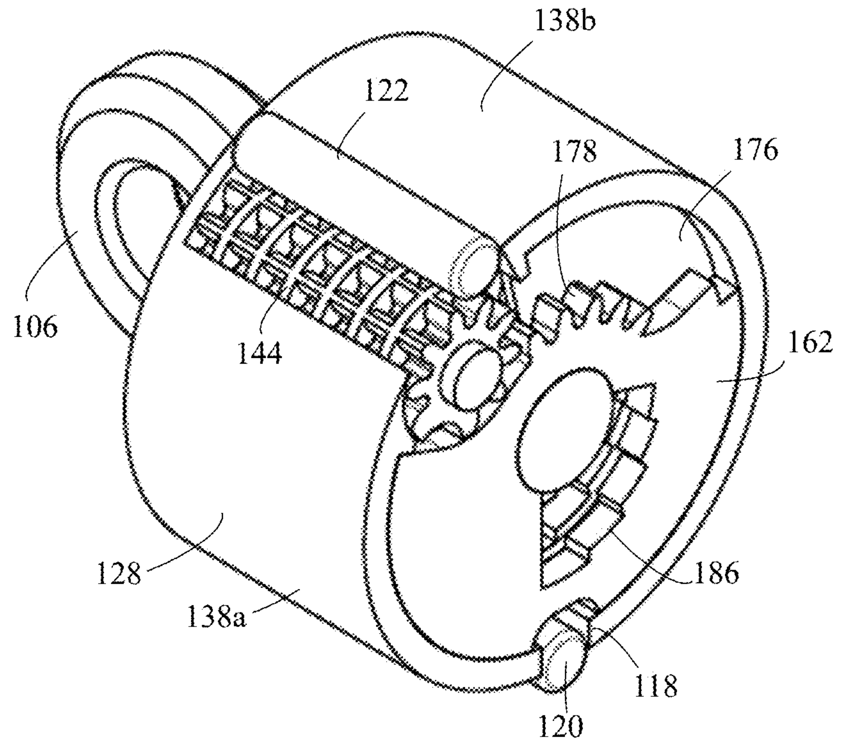
FIG. 7 is a rear perspective view of an embodiment of the present invention with the outer housing, disc carrier cap, and outer housing cap removed.
Figure 8:
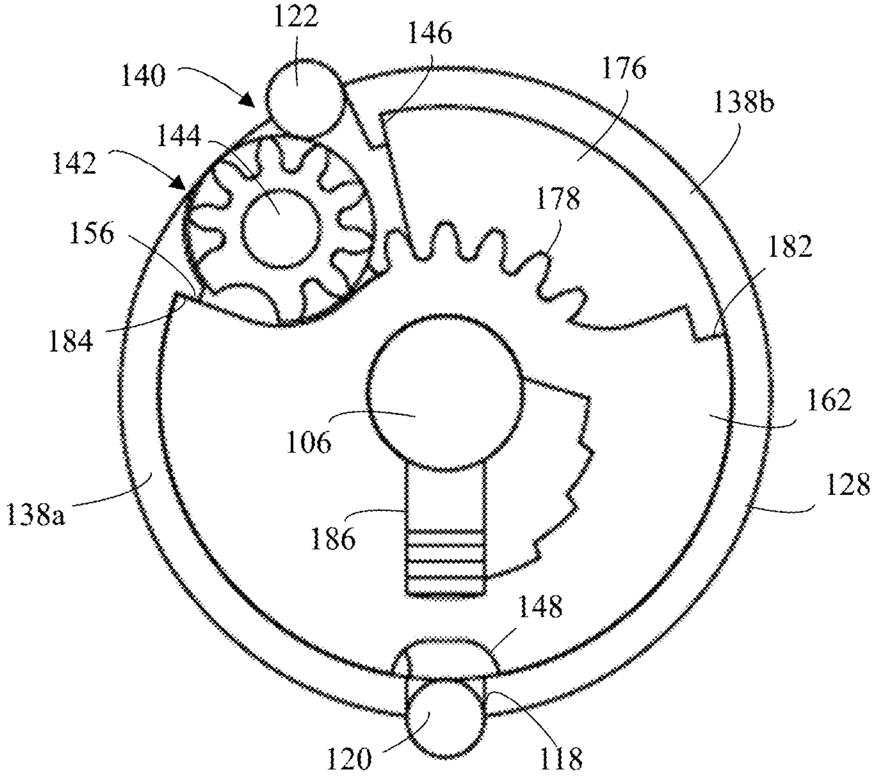
FIG. 8 is a rear view of an embodiment of the present invention with the outer housing, disc carrier cap, and outer housing cap removed.

Referring to FIG. 6, outer housing 102 of SDDL 100 houses disc carrier 128 and disc carrier cap 130 (not depicted in FIG. 6 to display internal components) and partially houses code sidebar 120 and synchronizer sidebar 122 when SDDL 100 is in a locked position. As will be explained in greater detail below, disc carrier 128 and disc carrier cap 130 are configured to rotate within outer housing 102 when SDDL 100 is unlocked with the appropriate key.

Referring now to FIGS. 7-10, disc carrier 128 includes proximal wall 136 with sidewalls 138*a* and 138*b* extending distally from proximal wall 136. Disc carrier 128 further includes sidebar slot 118 disposed between sidewalls 138*a* and 138*b*, which is sized to allow for passage of code sidebar 120. In addition, disc carrier 128 includes synchronizer sidebar passage 140 disposed between sidewalls 138*a* and 138*b*, which is sized to allow for passage of synchronizer sidebar 122.

In some embodiments, an end of sidewall 138*a* has curved section 142. Curved section 142 is configured to match the curvature of synchronizer 144. In some embodiments, curved section 142 is also configured to retain synchronizer 144 within the outer perimeter of disc carrier 128.

Figure 9A:
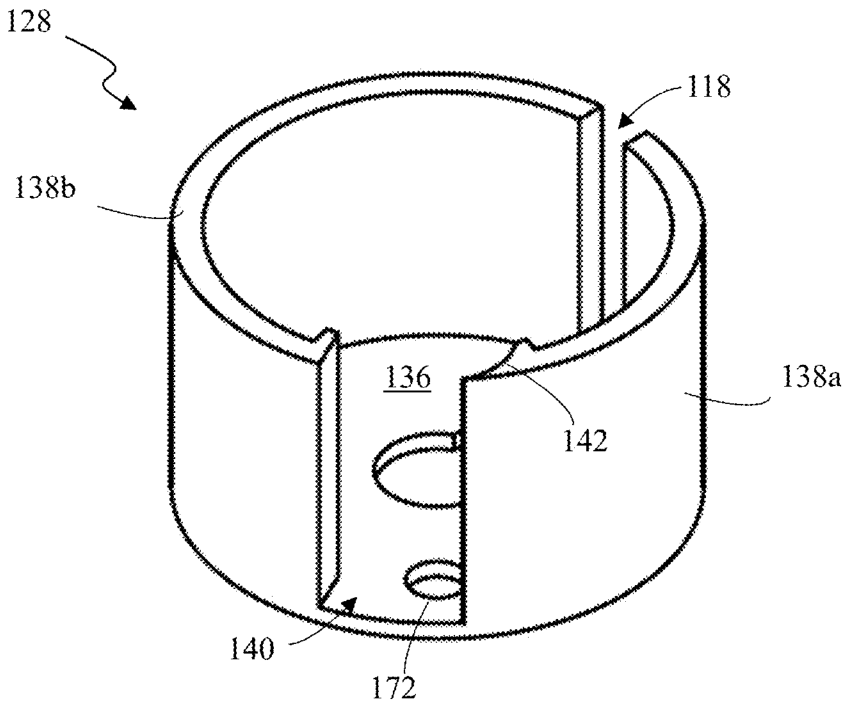
FIG. 9A is a perspective view of an embodiment of the disc carrier in accordance with an embodiment of the present invention.
Figure 9B:
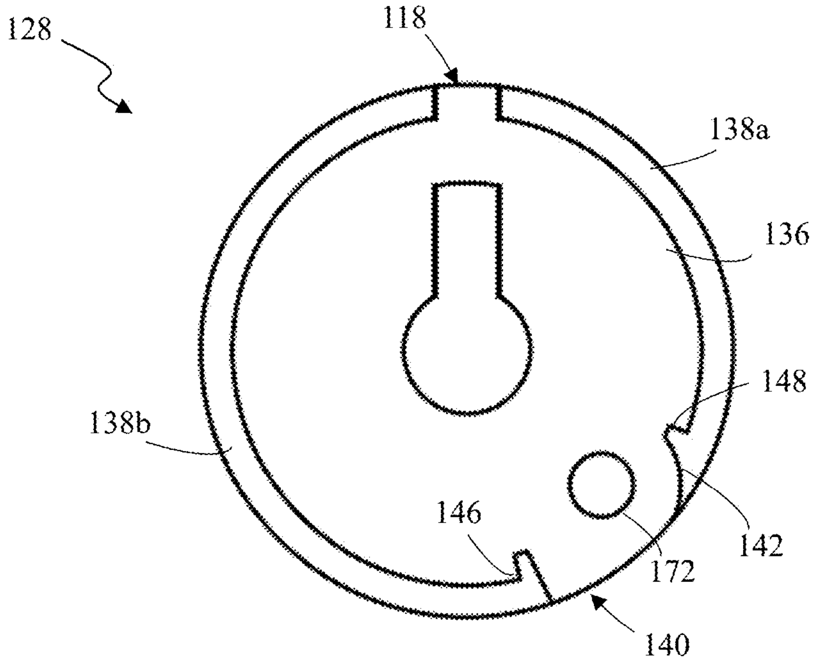
FIG. 9B is a rear view of an embodiment of the disc carrier in accordance with an embodiment of the present invention.

As best depicted in FIG. 9B, disc carrier 128 further includes a pair of rotational stops 146 and 148 that project inwardly towards the central longitudinal axis (or rotational axis) of SDDL 100. Rotational stops 146 and 148 are configured to prevent relative rotation of one or more discs 150-162 relative to disc carrier 128 by engaging rotational stops 164 and 166 one or more discs 150-162. The relative rotational functionality will be explained in greater detail in subsequent sections.

Figure 10:
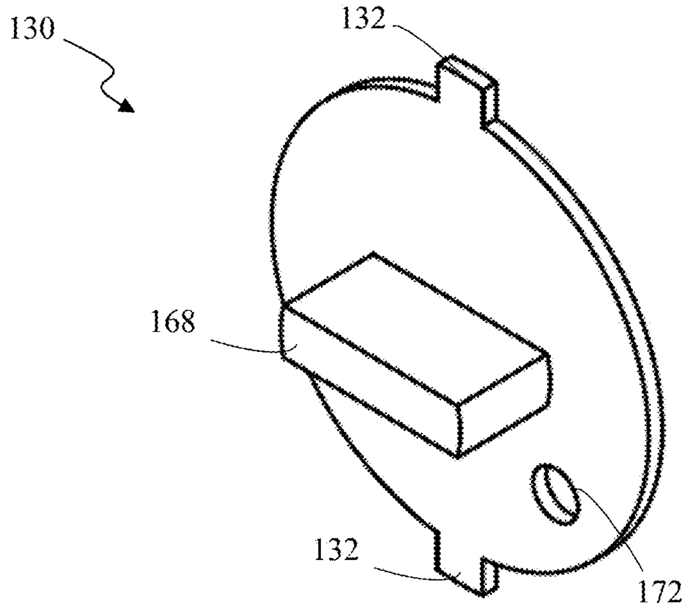
FIG. 10 is a perspective view of an embodiment of the disc carrier cap in accordance with an embodiment of the present invention.

As best depicted in FIG. 10, disc carrier cap 130 includes one or more rotation restricting pawls 132. Rotation restricting pawls 132 extend outwardly in a radial direction and may be diametrically opposed from each other. Rotation restricting pawls 132 are configured to reside within and translate through pawl slot 124. Pawl slot 124 extends less than the full circumference of outer housing 102 thereby preventing disc carrier 128 and disc carrier cap 130 from rotating a full 360 degrees. More specifically, pawl slot 124 extends less than the full circumference of outer housing 102 to prevent disc carrier 128 and disc carrier cap 130 from rotating beyond 90 degrees. The limited rotation of pawls 132 prevents sidebar 122 from entering sidebar groove 114 when rotated in the positive direction. They are required at the other end because without it sidebar 122 would not reseat (without some external force) and disc carrier 128 would rotate freely forever.

Disc carrier cap 130 also includes interface 168. Interface 168 is configured to extend through aperture 170 in outer housing cap 104. Interface 168 is intended to operably interact with a corresponding lock mechanism. Interface 168 may have an alternative shape and size based on the lock mechanism it is intended to interact with.

Disc carrier 128 and disc carrier cap 130 further include synchronizer receiving apertures 172. Synchronizer receiving apertures 172 are sized and oriented to received cylindrical extensions 174 extending from synchronizer 144 when SDDL 100 is fully assembled and allow for rotation of synchronizer 144 relative to disc carrier 128 and disc carrier cap 130.

Figure 11:
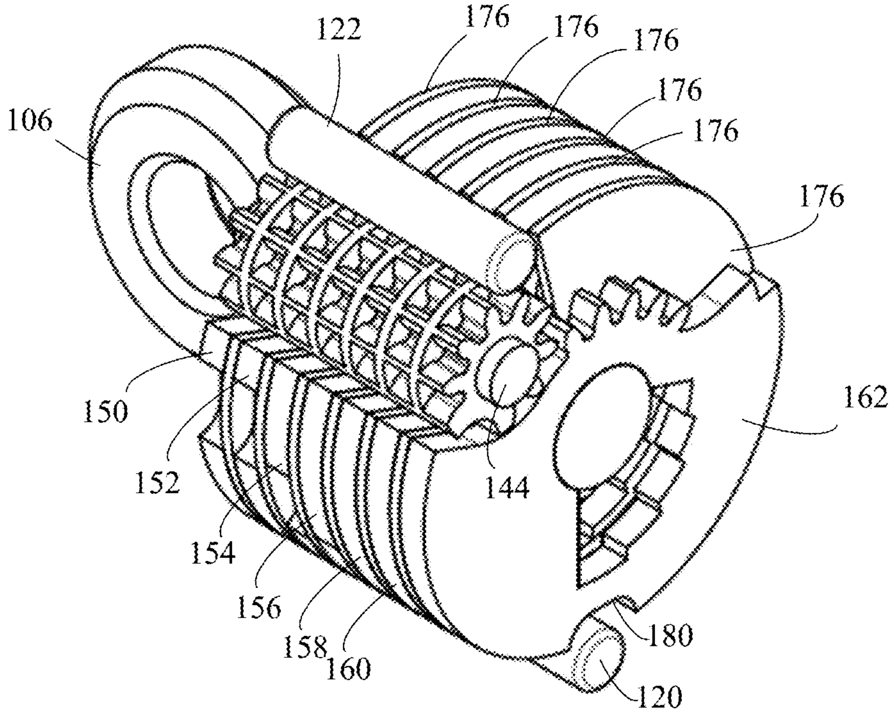
FIG. 11 is a top perspective view of an embodiment of the present invention with the outer housing, outer housing cap, disc carrier, and disc carrier cap removed.
Figure 12:
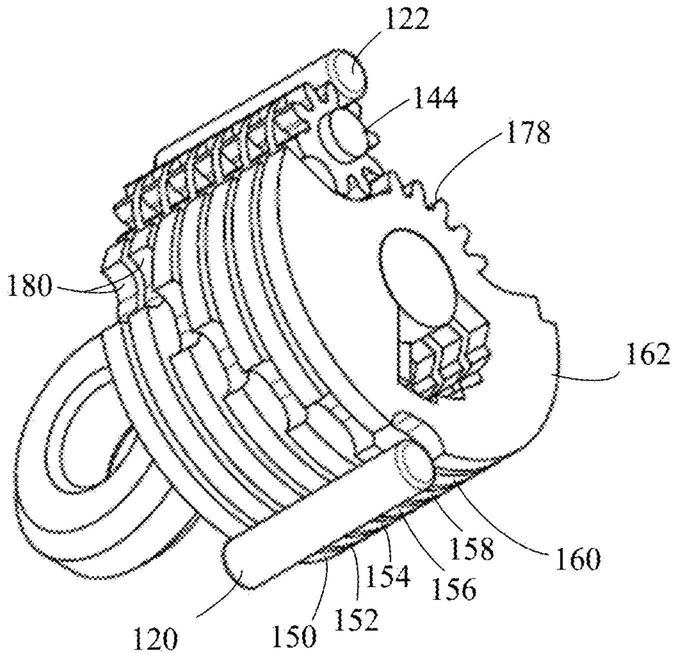
FIG. 12 is a bottom perspective view of an embodiment of the present invention with the outer housing, outer housing cap, disc carrier, and disc carrier cap removed.
Figure 13A:
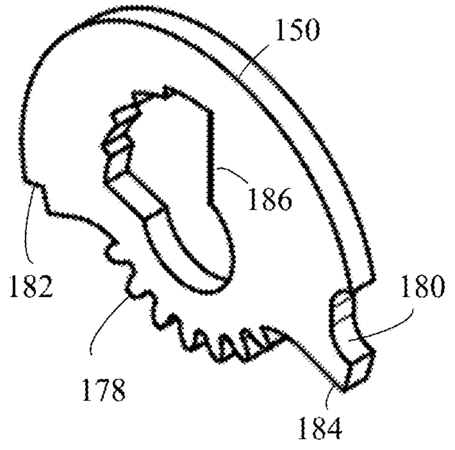
FIG. 13A is a perspective view of an embodiment of a drive disc in accordance with an embodiment of the present invention.
Figure 13B:
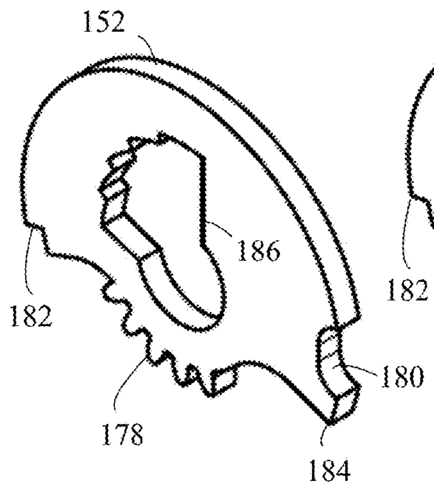
FIG. 13B is a perspective view of an embodiment of a code disc in accordance with an embodiment of the present invention.
Figure 13C:
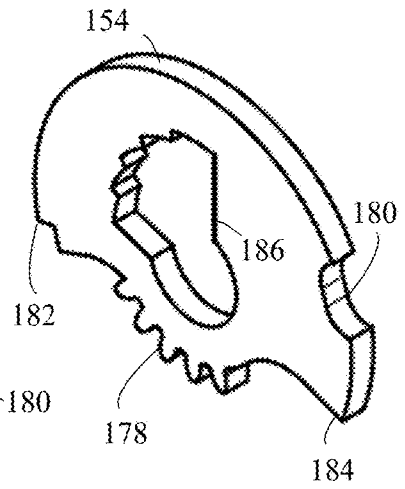
FIG. 13C is a perspective view of an embodiment of a code disc in accordance with an embodiment of the present invention.
Figure 13D:
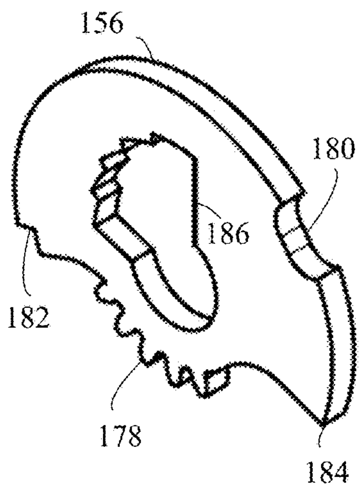
FIG. 13D is a perspective view of an embodiment of a code disc in accordance with an embodiment of the present invention.
Figure 13E:
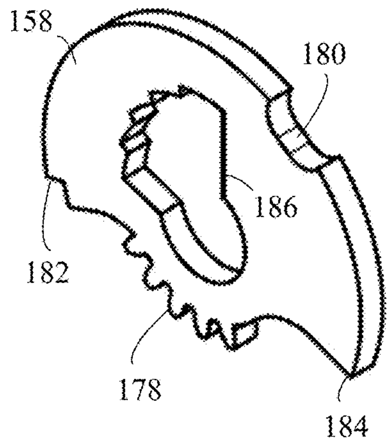
FIG. 13E is a perspective view of an embodiment of a code disc in accordance with an embodiment of the present invention.
Figure 13F:
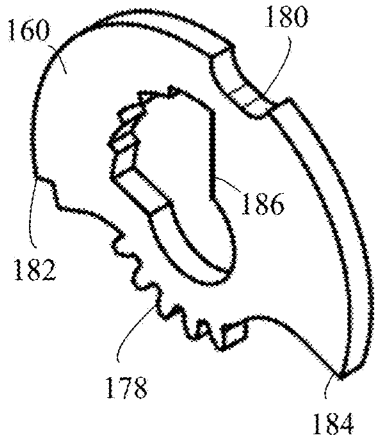
FIG. 13F is a perspective view of an embodiment of a code disc in accordance with an embodiment of the present invention.
Figure 13G:
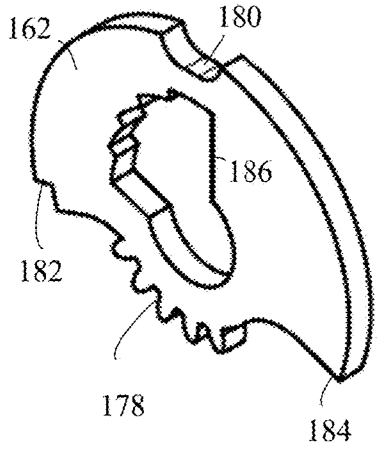
FIG. 13G is a perspective view of an embodiment of a code disc in accordance with an embodiment of the present invention.

Disc carrier 128 and disc carrier cap 130 house drive disc 150, a series of code discs 152-162, and spacers 176 disposed between each adjacent disc 150-162, which is best depicted in FIG. 11-12 in which disc carrier 128 and disc carrier cap 130 are removed from view. As best depicted in FIGS. 12-13, the outer periphery of each disc 150-162 includes gear teeth 178, code gate 180, and shoulders 182 and 184. In some embodiments, the outer periphery of one of more of discs 150-162 includes false gates.

Each disc 150-162 also includes a generally centrally located keyway 186. Each keyway 186 may have a specific shape or specific notch(es) configured to interact with key 106 at a specific degrees of rotation of key 106. Put another way, key 106 is bitted and each keyway 186 has a bitting that corresponds to the specific disc. In some embodiments, keyway 186 is the same for each disc 150-162. In some embodiments, keyways 186 may vary from one disc to another. Moreover, while the depicted keyway is that of a notch design, it is contemplated that any keyway and corresponding key design known in the art, including but not limited to traditional angle-cut key systems, may be incorporated with the various embodiments of the present invention.

SDDL 100 includes at least one drive disc 150 that has a "0 cut" or a 0-angle cut such that it matches the rotation of key 106 at every stage. This co-rotation is needed to rotate disc carrier 128 when key 106 reaches the 90-degree mark and to rotate synchronizer 144 in sync with key 106.

As previously noted, each disc 150-162 includes a code gate 180. The location of the code gates 180 vary between discs so that each disc is required to rotate a unique amount to unlock SDDL 100. While code gates 180 are depicted as being arranged in an even incremental spacing about the circumference of the corresponding code disc 152-162, some embodiments employ an alternative arrangement of code gates 180 about the circumference of the corresponding code disc 152-162.

No system is ever 100% perfect and this creates the need for tolerances. The major defining tolerance of SDDL 100 is the gear teeth backlash. This backlash means that there is a certain distance an attacker could rotate a singular disk without it affecting the other disks. To combat this risk, some embodiment of SDDL 100 include code gates 180 that have a circumferential extent that is larger than the diameter of sidebar 120. For example, with an additional space of 3 degrees, as long as the total backlash of the gear train is <3 degrees (so 1.5 degrees of backlash to engage synchronizer 144 and 1.5 degrees of backlash for synchronizer 144 to engage the other code discs), an attacker cannot "feel" the specific disc that is binding. It should be noted that if the backlash is larger than 3 degrees it will still reduce the effective angle the attacker can use to feel for disc binding.

Each disc 150-162 further includes a plurality of gear teeth 178. Gear teeth 178 are configured to interact with synchronizer 144. In some embodiments, gear teeth 178 are located and arranged about discs 150-162 such that gear teeth 178 do not interact with synchronizer 144 when at the 0-degree orientation within disc carrier 128 (i.e., the non-rotated locked position), which is depicted in FIGS. 11 and 12.

Figure 14:
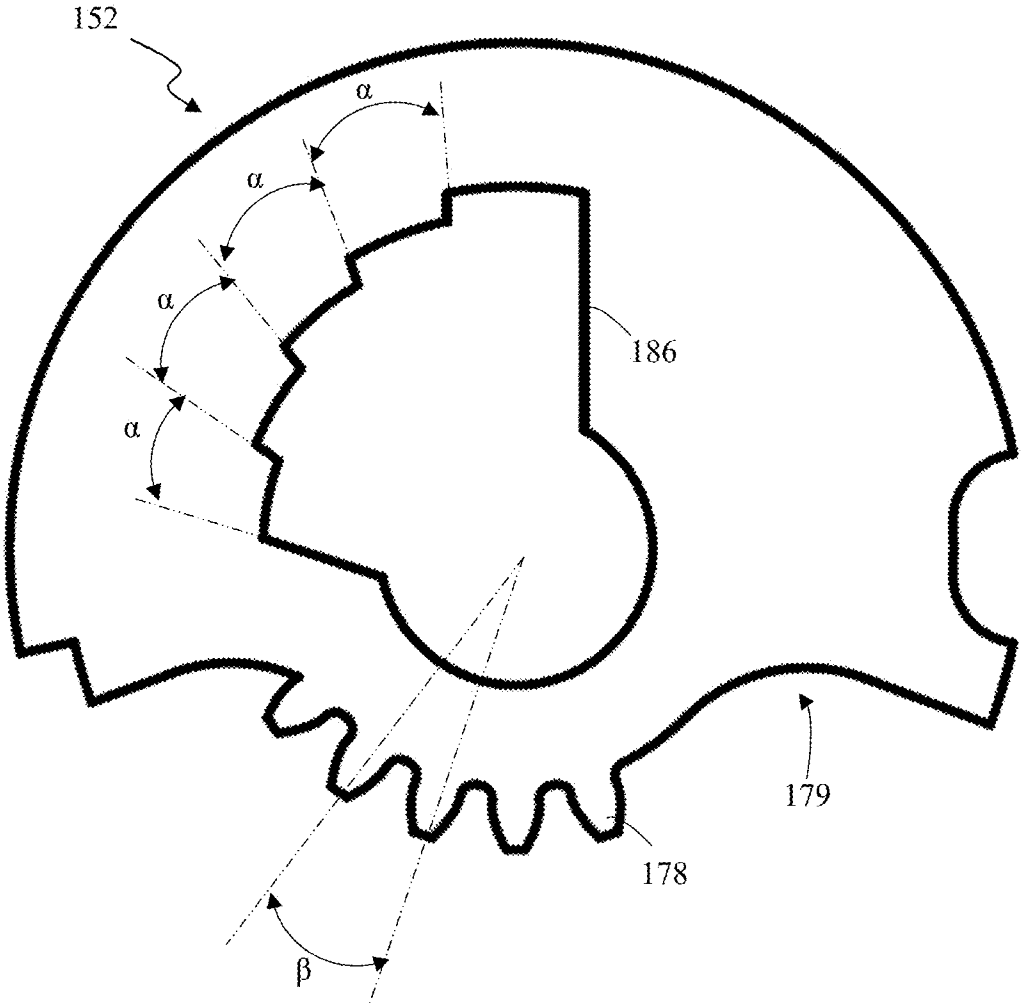
FIG. 14 is a front view of an embodiment of a code disc in accordance with an embodiment of the present invention.

As shown in FIG. 14, gear teeth 178 are circumferentially, equidistantly spaced at an angle β and the notches in keyway 186 are equidistantly spaced at an angle α. In some embodiments, angle β and angle α have approximately the same value, which is approximately 18 degrees in the depicted example. As a result, the rotation of discs 150-162 relative to their respective keyway notches allow gear teeth 178 to mesh with synchronizer 144 and to determine the space between code gates 180 of different discs.

In some embodiments, angle α is an integer multiple of angle β. If it is a fractional multiple then gear teeth 178 would not be "timed" to mesh with synchronizer 144. Also, the angle between each potential code gate 180 must be equal to angle α, if not then code gate 180 would not align with sidebar 122.

It should also be noted that discs 152-162 include five gear teeth 178 and drive disc 150 has seven. While the exact number can vary, drive disc 150 includes more gear teeth 178 than other discs 152-162 because drive disc 150 is configured to engage corresponding gear teeth 188 in synchronizer 144 when drive disk 150 is at 0-degrees of rotation, i.e., when SDDL 100 is in the locked position. In contrast, discs 152-162 include a circular receiving area 179 configured to partially enclose/abut synchronizer 144 when discs 152-162 are at their respective 0-degrees of rotation. While gear teeth 178 in discs 152-162 are not in contact with synchronizer 144 at their respective 0-degree positions, rotation of said discs bring gear teeth 178 into operable engagement with the plurality of slots 190 in synchronizer 144. It is contemplated that more or less gear teeth 178 may be employed to operably engage synchronizer 144. Likewise, alternative gearing and/or meshing structures may be used instead of gear teeth 178 and 188 and slots 190.

Figure 15:
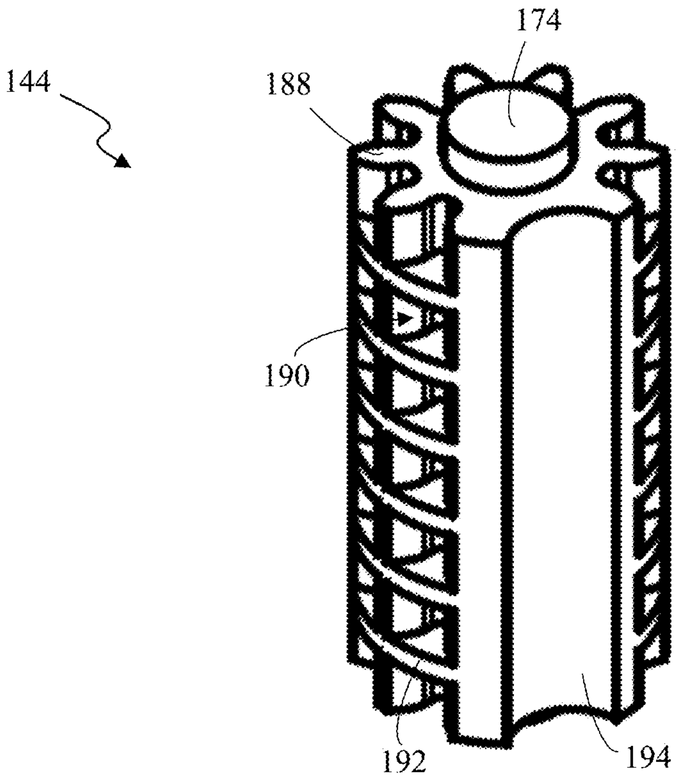
FIG. 15 is a perspective view of an embodiment of a synchronizer in accordance with an embodiment of the present invention.
Figure 16:
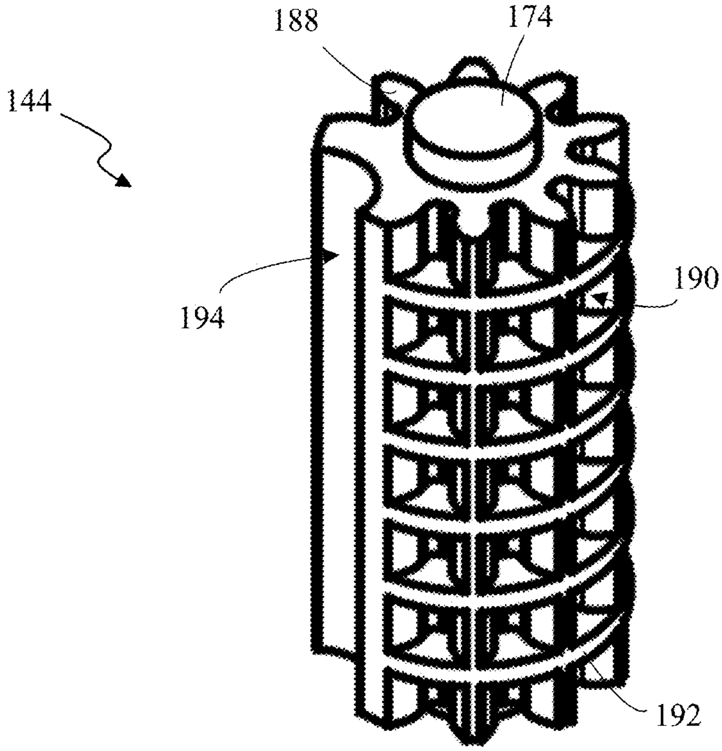
FIG. 16 is an alternative perspective view of an embodiment of a synchronizer in accordance with an embodiment of the present invention.

Referring now to FIGS. 15-16, synchronizer 144 includes a proximal end and a distal end with a main body extending therebetween. Each end includes cylindrical extension 174 configured to rotatably engage aperture 172 in disc carrier 128 and disc carrier cap 130. It should be noted that alternative approaches and designs may be used to rotatably secure synchronizer 144 within disc carrier 128.

The main body of synchronizer 144 includes gear teeth 188 proximate to the proximal end. As previously explained, gear teeth 188 are configured to operably engage gear teeth 178 on drive disc 150. In some embodiments, gear teeth 188 are located at a different location about the main body that is in radial alignment with gear teeth 178 on drive disc 150 when drive disc 150 is located at a different location within the stack of discs 150-162. It should also be noted that alternative gearing and/or meshing structures may be used instead of gear teeth 178 and 188.

Synchronizer 144 also includes a plurality of slots 190 configured to radially aligned with discs 152-162 and operably receive gear teeth 178 on said discs. It should also be noted that alternative gearing and/or meshing structures may be used instead of gear teeth 178 and slots 190.

Some embodiments include longitudinally spaced, circumferentially extending supports 192 that border the plurality of slots 190. In some embodiments, supports 192 are radially aligned with spacers 176 and have a similar thicknesses to maintain the spacing between discs 152-162. Supports 192 also prevents synchronizer sidebar 122 from entering the spaces that would exist with a basic pinion which could potentially cause binding in the mechanism. Supports 192 could be placed anywhere along synchronizer 144 as long as there are at least two of them.

Synchronizer 144 further includes synchronizer sidebar gate 194. Synchronizer sidebar gate 194 is sized to at least partially receive synchronizer sidebar 122, such that synchronizer sidebar 122 resides within the outer perimeter of disc carrier 128, when synchronizer 144 is rotated to radially align synchronizer sidebar gate 194 with synchronizer sidebar 122.

Figure 17:
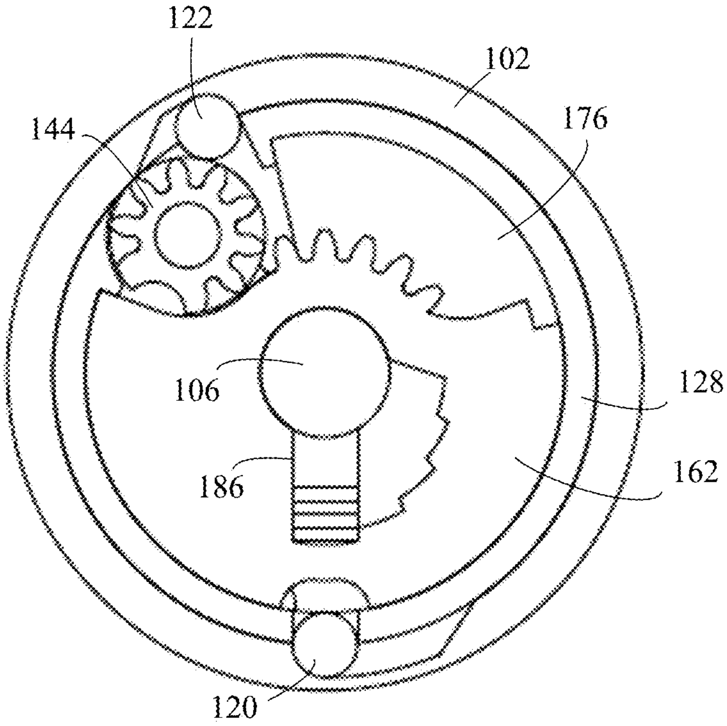
FIG. 17 is a rear view of an embodiment of the present invention when the device is in a locked position.
Figure 18:
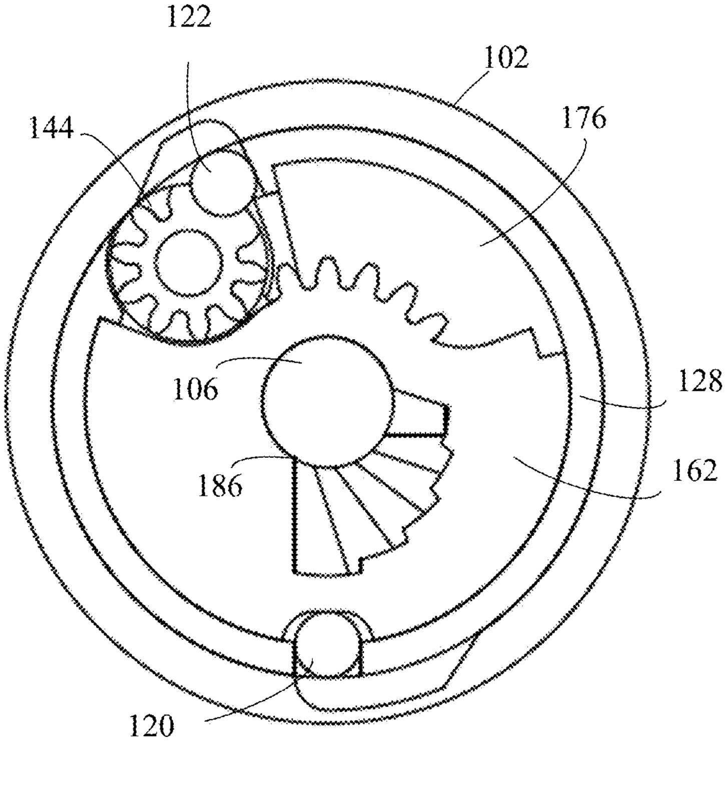
FIG. 18 is a rear view of an embodiment of the present invention after the key has been rotated approximately 90 degrees.
Figure 19:
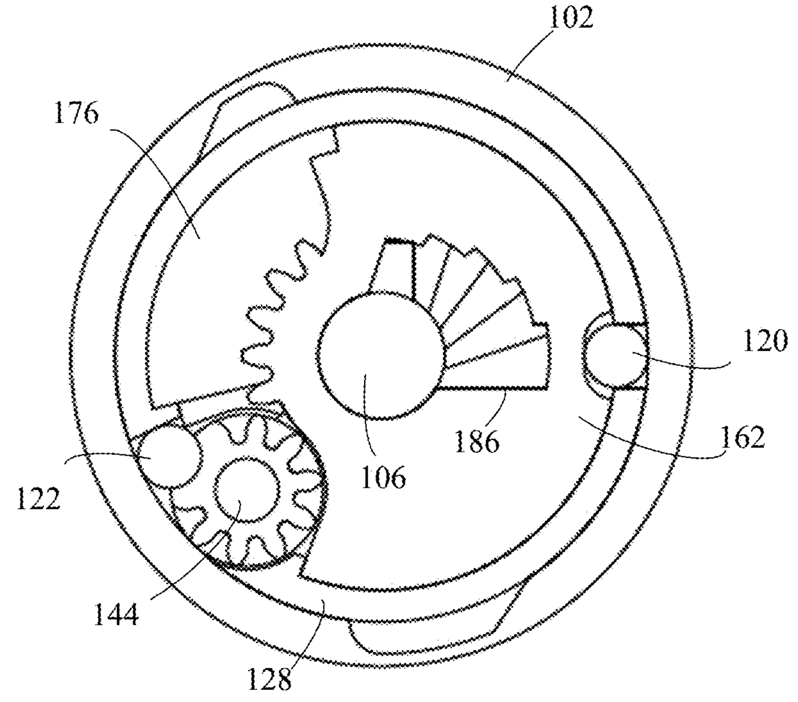
FIG. 19 is a rear view of an embodiment of the present invention after the key has been rotated approximately 180 degrees.

Referring now to FIGS. 17-19, the internal components of SDDL 100 are in a locked position in FIG. 17. In the locked position the internal component are considered to be at 0-degrees of rotation. During normal operation with the appropriate key 106, key 106 is inserted into keyways 110 and 186. Key 106 can then be rotated a total of 180 degrees around its axis. In the first 90 degrees, key 106 initially rotates drive disc 150 because drive disc 150 rotates at the same rate as key 106. Continued rotation of key 106 brings key 106 into contact with the keyways 186 of each code disc 152-162 thereby causing rotation of code disc 152-162. As key 106 rotates the initial 90 degrees, key 106 contacts each code disc 152-162 thereby rotating each disc 152-162 to its respective degree of rotation to align each code gate 180 with sidebar slot 118 in disc carrier 128.

Any rotation of key 106 also causes drive disc 150 to engage synchronizer 144 and as discs 152-162 are rotated out of their respective 0-degree positions, said discs also engage synchronizer 144. More specifically, when a particular disc 152-162 has rotated a distance equal to the angle between gear teeth 178 (e.g., 18 degrees in the example provided herein) then the particular disc begins to mesh with synchronizer 144. After this point said disc is bound to all other code discs that are also meshed with synchronizer 144 and each of those discs are incapable of moving individually.

Once the key reaches 90 degrees of rotation, all discs 150-162 have rotated into meshed engagement with synchronizer 144. Because all the discs 150-162 are operably connected, an attacker is unable to move one disc without rotating the others. Moreover, when attempting to "feel" if a disc is set correctly or not, the attacker causes rotation of all discs and is thus incapable of detecting which specific disc is binding.

After the first 90 degrees of rotation, as depicted in FIG. 18, sidebar 120 falls into code gates 180, which is how the code is checked. The second approximately 90 degrees of rotation of key 106 causes further rotation of discs 150-162 and also causes rotation of disc carrier 128 and disc carrier cap 130 through the interaction of shoulder 182 of drive disc 150 with rotational stop 146 of disc carrier 128. In other words, rotation of key 106 causes co-rotation of discs 150-162, disc carrier 128, and disc carrier cap 130. Rotation of disc carrier cap 130 causes rotation of interface 168 which operably interacts with a corresponding lock mechanism.

Figure 20:
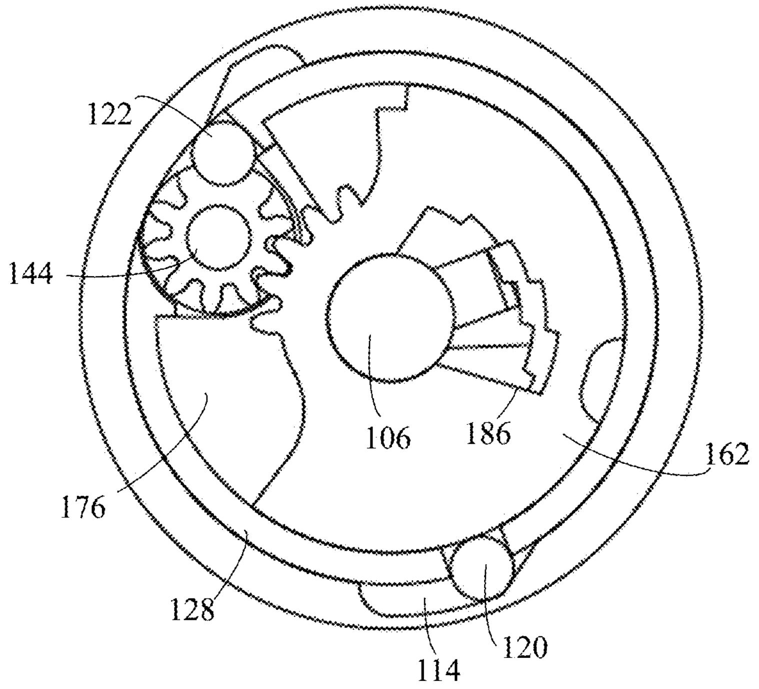
FIG. 20 is a rear view of an embodiment of the present invention illustrating how the device binds when discs are rotated without the proper key.

Referring now to FIG. 20, if an attacker attempts to rotate the one or more discs 150-162 individually, each rotated disc will engage synchronizer 144 and eventually rotate synchronizer 144 until synchronizer sidebar gate 194 radially aligns with synchronizer sidebar 122. The attacker will be able to continue rotating discs 150-162 and disc carrier 128 until code sidebar 120 binds within sidebar groove 114. The attacker will be unable to further rotate disc carrier 128 to unlock SDDL 100. Thus, the SDDL 100 provides a significant advancement in disc detainer lock security by synchronizing the movement of all discs 150-162 through the use of gear teeth 178 and synchronizer 144, preventing independent disc manipulation and greatly reducing the possibility of successful picking.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A disc detainer lock, comprising:

a. an outer housing;

b. a plurality of rotatable discs residing within the outer housing, wherein each disc in the plurality of discs includes an outer periphery and a code gate disposed within the outer periphery;

c. a code sidebar configured to at least partially reside within the code gate of each disc when an appropriate key is used to rotate the plurality of discs to align the code gates with the code sidebar; and d. a synchronizer disposed within the outer housing in a rotatable arrangement relative to the plurality of rotatable discs, wherein the synchronizer is configured to operably engage each disc of the plurality of rotatable discs only after each disc is rotated from a non-rotated locked orientation by at least a predetermined amount, such that the synchronizer and each disc engaged with the synchronizer co-rotate thereby preventing independent rotation of each rotatable disc of the plurality of rotatable discs.

2. The disc detainer lock of claim 1, wherein each disc includes a plurality of gear teeth configured to operably engage the synchronizer.

3. The disc detainer lock of claim 1, further including:

a. a synchronizer sidebar;

b. a synchronizer sidebar gate disposed in the synchronizer;

c. wherein the synchronizer sidebar is configured to at least partially enter the synchronizer sidebar gate when the synchronizer is rotated to bring the synchronizer sidebar gate into alignment with the synchronizer sidebar.

4. The disc detainer lock of claim 1, further including a disc carrier, wherein the disc carrier houses the plurality of rotatable discs and the synchronizer resides within an outer perimeter of the disc carrier.

5. The disc detainer lock of claim 4, wherein the disc carrier is configured to rotate relative to the outer housing and further includes a sidebar passage and a synchronizer side bar passage.

6. The disc detainer lock of claim 1, further including a drive disc having a plurality of gear teeth configured to be in meshing engagement with the synchronizer when the plurality of rotatable discs are in non-rotated locked orientations and configured to rotate at a same rate of rotation as the appropriate key.

7. The disc detainer lock of claim 1, wherein the outer housing includes:

a. a sidebar groove disposed in an internal surface of a sidewall of the outer housing;

b. a synchronizer sidebar groove disposed in the internal surface of the sidewall of the outer housing;

c. wherein the sidebar groove is sized to at least partially house the code sidebar and the synchronizer sidebar groove is sized to at least partially house a synchronizer sidebar when the disc detainer lock is locked.

8. A disc detainer lock, comprising:

a. a plurality of rotatable discs residing within a disc carrier, wherein each disc in the plurality of discs includes an outer periphery, a set of gear teeth, and a code gate disposed within the outer periphery;

b. a code sidebar configured to at least partially reside within the code gate of each disc when all of the code gates are aligned; and c. a synchronizer at least partially disposed within the disc carrier in a rotatable arrangement relative to the disc carrier, wherein the synchronizer is configured to operably engage each disc when each disc is rotated a predetermined amount front a non-rotated locked position, such that the synchronizer and each disc that is engaged with the synchronizer co-rotate and prevent independent rotation of each disc of the plurality of rotatable discs.

9. The disc detainer lock of claim 8, further including:

a. a synchronizer sidebar;

b. a synchronizer sidebar gate disposed in the synchronizer;

c. wherein the synchronizer sidebar is configured to at least partially enter the synchronizer sidebar gate when the synchronizer is rotated to bring the synchronizer sidebar gate into alignment with the synchronizer sidebar.

10. The disc detainer lock of claim 9, wherein the disc carrier further includes a sidebar passage and a synchronizer side bar passage thereby allowing the sidebar and to pass through the sidebar passage when aligned and allowing the synchronizer side bar to pass through the synchronizer sidebar passage when aligned.

11. The disc detainer lock of claim 10, further including an outer housing, wherein the disc carrier is configured to rotate relative to the outer housing.

12. The disc detainer lock of claim 11, wherein the outer housing includes:

a. a sidebar groove disposed in an internal surface of a sidewall of the outer housing;

b. a synchronizer sidebar groove disposed in the internal surface of the sidewall of the outer housing;

c. wherein the sidebar groove is sized to at least partially house the code sidebar and the synchronizer sidebar groove is sized to at least partially house a synchronizer sidebar when the disc detainer lock is locked.

13. The disc detainer lock of claim 8, further including a drive disc configured to rotate at a same rate of rotation as the appropriate key.

14. A disc detainer lock, comprising:

a. a plurality of rotatable discs residing within a disc carrier, wherein each disc in the plurality of discs includes an outer periphery, a set of gear teeth, and a code gate disposed within the outer periphery;

b. a code sidebar configured to at least partially reside within the code gate of each disc when all of the code gates are aligned; and c. a synchronizer at least partially disposed within the disc carrier in a rotatable manner, wherein the synchronizer is configured to operably engage each disc when each disc is rotated a predetermined amount from a non-rotated locked orientation such that the gear teeth of each of the plurality of discs mesh with the synchronizer only after said predetermined rotation, thereby resulting in co-rotation of the synchronizer and each disc that is engaged with the synchronizer and binding the plurality of discs together against individual manipulation.

15. The disc detainer lock of claim 14, further including:

a. a synchronizer sidebar;

b. a synchronizer sidebar gate disposed in the synchronizer;

c. wherein the synchronizer sidebar is configured to at least partially enter the synchronizer sidebar gate when the synchronizer is rotated to bring the synchronizer sidebar gate into alignment with the synchronizer sidebar.

16. The disc detainer lock of claim 15, wherein the disc carrier further includes a sidebar passage and a synchronizer side bar passage thereby allowing the sidebar and to pass through the sidebar passage when aligned and allowing the synchronizer side bar to pass through the synchronizer sidebar passage when aligned.

17. The disc detainer lock of claim 16, further including an outer housing, wherein the disc carrier is configured to rotate relative to the outer housing.

18. The disc detainer lock of claim 17, wherein the outer housing includes:

a. a sidebar groove disposed in an internal surface of a sidewall of the outer housing;

b. a synchronizer sidebar groove disposed in the internal surface of the sidewall of the outer housing;

c. wherein the sidebar groove is sized to at least partially house the code sidebar and the synchronizer sidebar groove is sized to at least partially house a synchronizer sidebar when the disc detainer lock is locked.

19. The disc detainer lock of claim 14, further including a drive disc configured to rotate at a same rate of rotation as the appropriate key.

20. The disc detainer lock of claim 14, wherein the disc carrier and each disc includes a keyway configured to receive the appropriate key.

* * * * *